United States Patent [19]

Monson

[11] Patent Number: 5,077,785
[45] Date of Patent: Dec. 31, 1991

[54] SYSTEM FOR RECORDING COMMENTS BY PATRONS OF ESTABLISHMENTS

[76] Inventor: Gerald D. Monson, 9367 65th St. North, Stillwater, Minn. 55082

[21] Appl. No.: 522,008

[22] Filed: Jul. 13, 1990

[51] Int. Cl.⁵ .............................................. H04M 1/64
[52] U.S. Cl. ........................................ 379/67; 379/68; 379/79; 379/87; 379/453
[58] Field of Search .................... 379/67, 68, 79, 82, 379/87, 171, 172, 173, 176, 453

[56] References Cited

U.S. PATENT DOCUMENTS

| | | | |
|---|---|---|---|
| 2,653,192 | 9/1953 | Shipton | 379/176 |
| 4,617,425 | 10/1986 | Nakamura et al. | 379/68 |
| 4,713,835 | 12/1987 | Bond et al. | 379/79 |
| 4,731,811 | 3/1988 | Dubus | 379/76 |
| 4,873,713 | 10/1989 | Yamanouchi et al. | 379/67 |
| 4,891,835 | 1/1990 | Leung et al. | 379/88 |
| 4,903,290 | 2/1990 | King | 379/453 |
| 4,959,735 | 9/1990 | Kawai | 360/33.1 |

Primary Examiner—James L. Dwyer
Assistant Examiner—Huyen D. Le
Attorney, Agent, or Firm—Jacobson and Johnson

[57] ABSTRACT

An establishment which provides goods and/or services to customers or patrons, such as a retail store or restaurant, is provided with a telephone handset in a stand located at a convenient and readily accessible spot but yet which is outside the congested or heavily trafficked area and gives the user a feeling of privacy and the telephone handset is coupled to a message repeater and a message recorder so when the customer or patron picks up the telephone handset out of its cradle he or she hears a message from the message repeater which provides an introduction and instructions and then the customer talks into the mouthpiece or transmitter of the telephone handset and the message is recorded.

1 Claim, 3 Drawing Sheets

SYSTEM FOR RECORDING COMMENTS BY PATRONS OF ESTABLISHMENTS

FIELD OF THE INVENTION

This invention is to provide a system for customers or patrons of establishments, such as restaurants, department stores or other providers of goods and/or services, to voice their comments concerning the establishment, such as the quality and prices of goods and services or the like, while retaining anonymity.

DESCRIPTION OF THE PRIOR ART

Many commercial establishments provide their customers or patrons with means for making written comments about the service and/or goods which are provided by the establishment. Others have a policy of having the manager or some other representative ask patrons for their comments. Most patrons do not want to take the time to write down their comments or often are somewhat embarrassed to write the comments in front of or in view of the clerk or waiter or waitress who has served them. With respect to oral comments, many patrons avoid voicing criticisms. A recent newspaper article (Minneapolis Star Tribune Sunday. March 5, 1990) in quoting a person somewhat experienced in this field, states—"you know how that works—, you can ask and ask how everything is, and the customers will just say 'fine', even if it's not. Then they'll go away and never come back".

SUMMARY OF THE INVENTION

A telephone handset is mounted in a freestanding or wall-mounted stand within an establishment which provides goods and/or services to the public at a conveniently accessible spot but yet out of the congested or heavily trafficked areas. The handset is electrically connected to an electronic message repeater and an electronic message recorder. When the telephone handset is lifted out of its cradle the message repeater is energized and delivers a voice message to the receiver or speaker of the telephone handset. Preferably, the recorded message will explain the purpose of the system, thank the patron for using the establishment's facilities and give instructions on how the patron can voice and record his or her comments. When the recorded message is completed, the customer momentarily pushes a button to energize the electronic message recorder and then starts speaking into the transmitter or microphone of the telephone handset. This voice message is recorded and later can be played back by authorized personnel of the establishment. Preferably the recorder has means for recording the time and date that the message started and the length of the patron's message. Also, preferably, the recorder will produce a signal indication when the capacity of the medium in which the patron's messages are recorded is reaching its limit so that the medium can be replaced. Preferably the medium should be able to record at least up to several hours.

DESCRIPTION OF THE PREFERRED EMBODIMENTS

Figure 1:
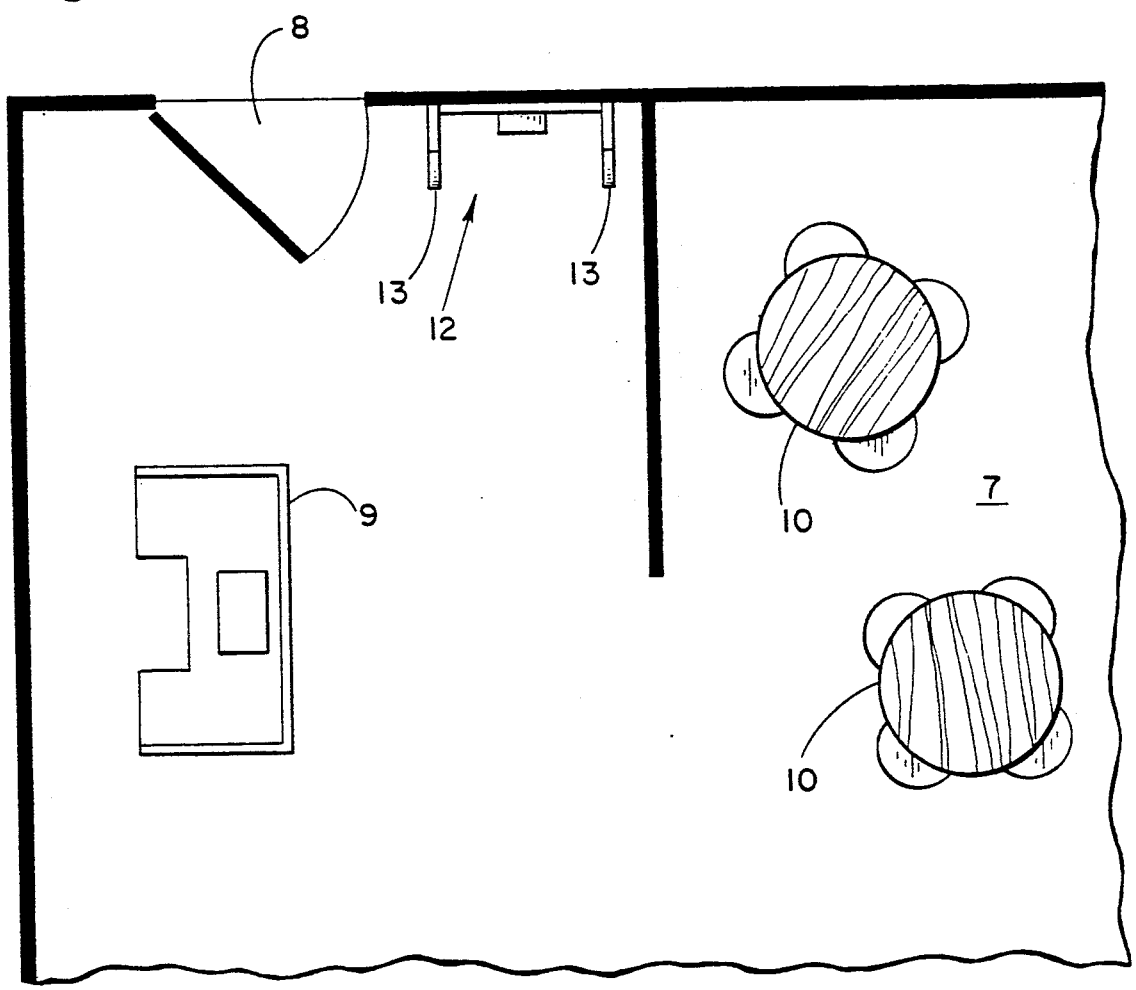
FIG. 1 is a portion of a typical floor plan of a typical commercial establishment with which the instant invention may be utilized.
Figure 2:
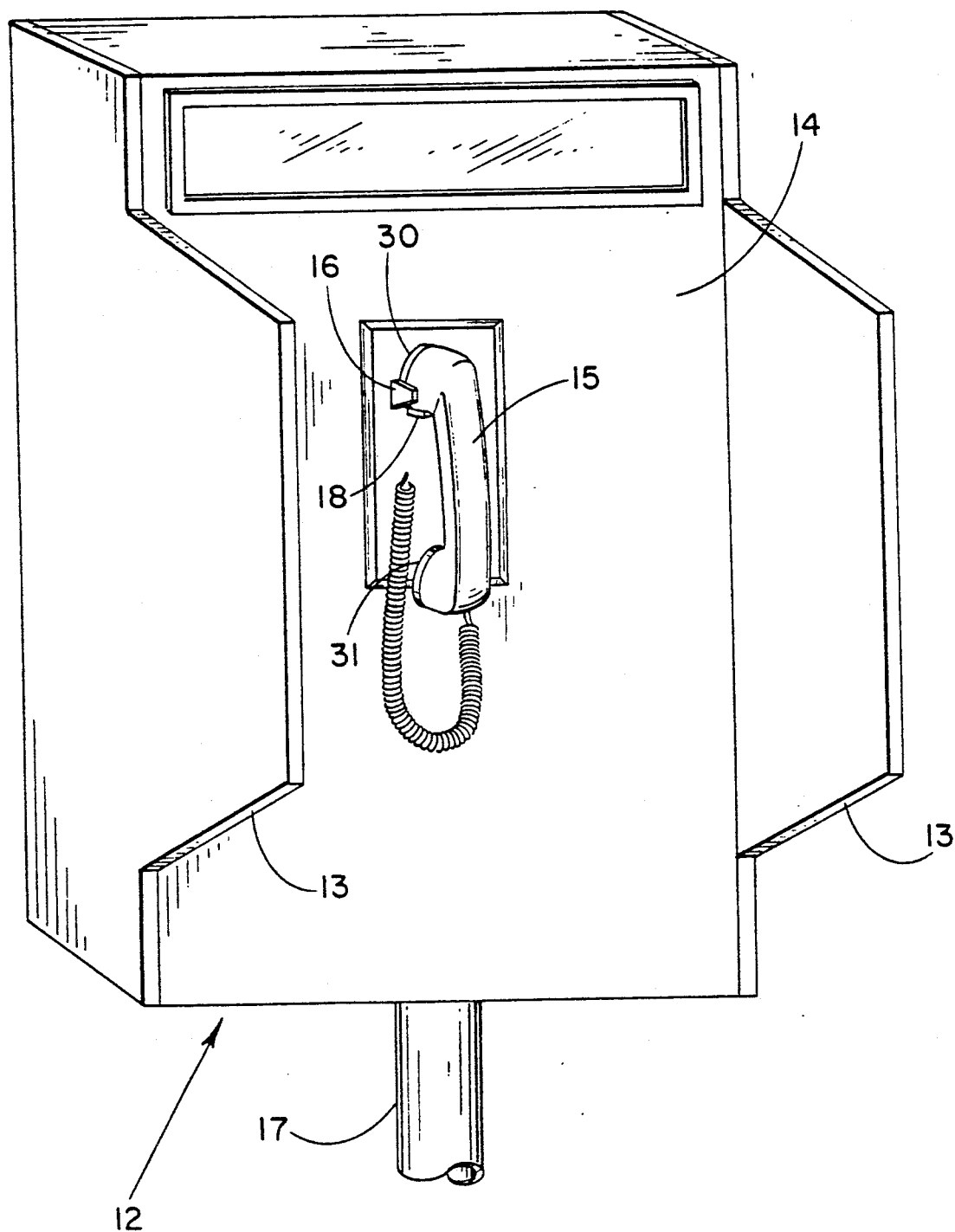
FIG. 2 is an illustration of a typical telephone handset stand for utilization in the preferred embodiment of the invention.

Typically and conventionally, a commercial public restaurant dining room area 7 has a number of tables 10 (or booths, not shown) appropriately spaced. Commonly, near the exit and/or entrance 8 is a stand 9 which is used by the cashier to collect payment from patrons or customers as they leave and by the maitre 'd or hostess for seating the patrons as they arrive. As part of the instant invention, a stand, generally designated by reference numberal 12, is located near exit 8 mounted in some conventional fashion on a wall or, alternatively, on a free-standing stand supported by a pillar or a post, not shown. Preferably the stand has the shape of a conventional telephone stand with barriers 13 on each side of a panel 4 to provide some isolation so that the voice or conversation of the user of the telephone handset 15 is not easily overheard and the user gets a feeling of privacy. Telephone handset 15 is mounted in a hook-switch cradle 16 in conventional fashion. Hook-switch cradle 16 conventionally has a cradle for holding the handset when not in use and a switch which signals when the handset is out of the cradle. Conventionally, telephone handset 15 has an earpiece or receiver or speaker 30 at one end and a mouthpiece or transmitter or microphone 31 at the other end. A push-to-talk switch 21, not shown in FIG. 2, is also mounted on handset 15. A cable 17 carries electrical wires from the telephone handset and the cradle to electrical components with which the telephone handset is used. These components may be mounted in a suitable cabinet, not shown, adjacent to stand 12 or may be at some remote location. This is a matter of choice. If the storage cabinet for these other components is located nearby or is easily accessible, it should be locked up for security.

When the customer or patron leaves the restaurant, stand 12 and handset 15 are readily accessible and yet outside the earshot of the cashier or hostess or maitre 'd or any other employees of the restaurant so that the patron can make his or her comments concerning the service at the restaurant without fear of being overheard and with some feeling of privacy.

Figure 3:
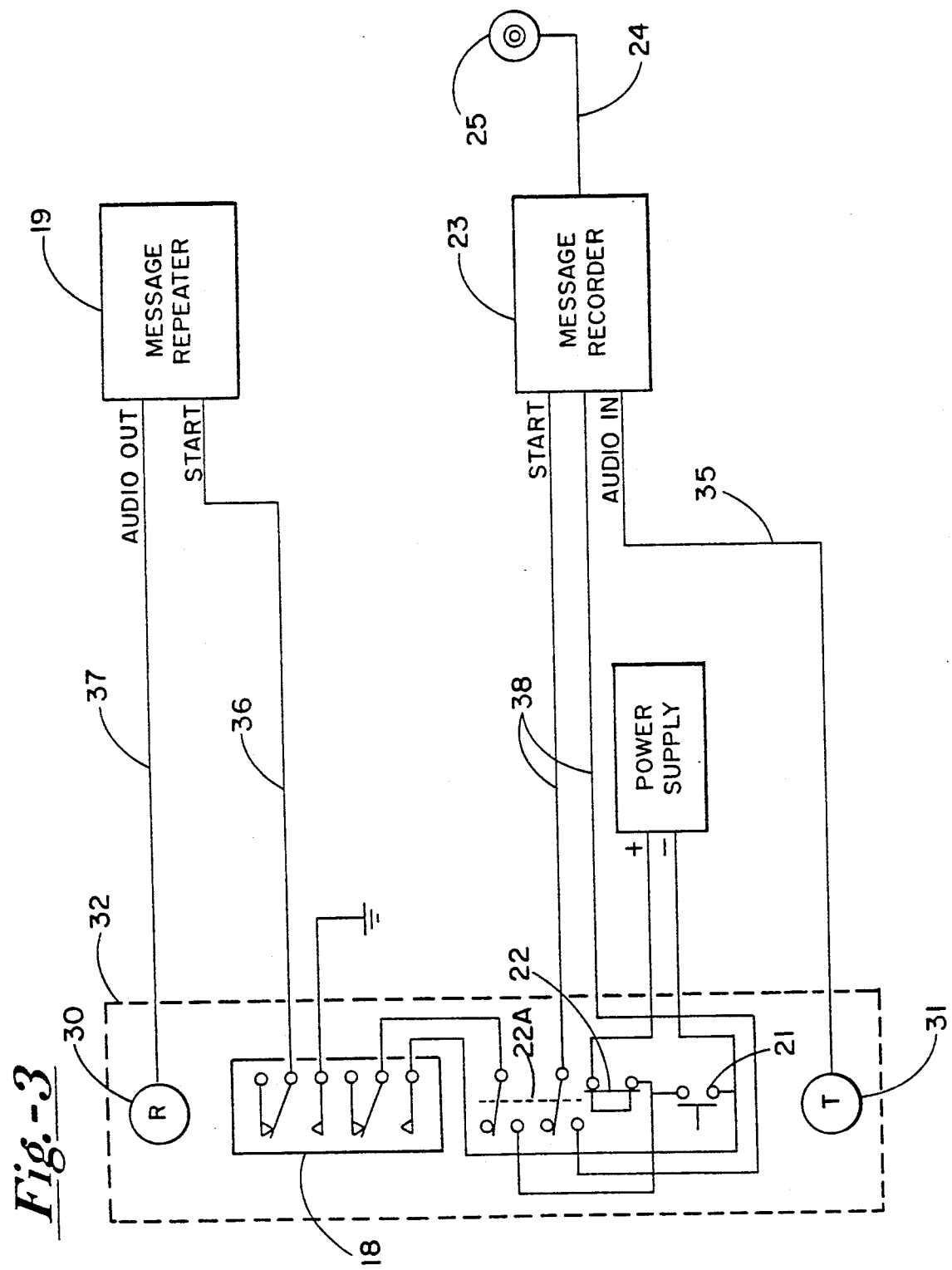
FIG. 3 is an electrical schematic showing the communication between the various components of the preferred embodiment of the invention.

Referring to FIG. 3, dashed line 32 indicates the confines of the telephone handset and cradle switch.

In operation, when the customer or patron lifts handset 15 off cradle 16, a circuit is closed through switch contact 8 to energize message repeater 19 through line or conductor 36 which sends a prerecorded voice message out to speaker or receiver 30 of telephone handset 15 on line 37. Preferably this message will first thank the caller for patronizing the establishment, then explain the purpose of the system and then give the caller instructions on how to record his or her comments. Generally the instructions merely tell the patron to momentarily push pushbutton 21 and then start speaking into the mouthpiece in order to record his or her voice message. The message carried by message repeater 19 can be changed from time to time as desired. The momentary closing of pushbutton 21 completes a circuit to energize relay coil 22 whose contacts 22A energize voice recorder 23 through a pair of lines 38. The relay contacts 22A also lock in operation of relay coil 22 so that recorder 23 will remain activated even after pushbutton 21 is released until handset 15 is placed back on switch cradle 16. When the patron starts talking, the voice message transformed into electrical signals by transmitter 31 is carried by wire 35 to the recording input of recorder 23 where it is recorded on a suitable medium such as a tape cassette. Message recorder 23 conventionally will also record the time and date when the message is started. Conventionally, message recorder 23 also has a timer or the like which will generate an output signal on wire or line 24 which energizes a visual or audible indicator 25 to indicate that the recording medium is reaching its recording capacity and should be changed. In general the recording medium will run at least several hours before it has to be replaced. The user or patron will be able to voice his or her comments in a few seconds or in a few hours as he or she sees fit.

By means not shown or described, in due course the patron's recorded message will be heard by or transmitted to responsible management personnel. The exact words of the message are preserved in case there is any question as to what the patron stated in his or her comments. The convenience and ease of this system makes it much more likely that patrons will utilize this system and take ample time to make appropriate comments concerning the services or goods of the establishment as compared to the alternatives of writing comments or voicing comments directly to an employee. A particularly attractive feature of the system is that it uses conventional commercially available components so it can be installed easily and inexpensively in any convenient location and is easy to use, operate and maintain. Typically telephone handset 15 and cradle 16 combination along with a push-to-talk pushbutton 21, message repeater 19, and voice recorder 23, with timer and signal output for operating a visual indicator, are all commercially available. The voice recorder is preferably a video recorder which is used to record just audio on a suitable tape cassette. A video recorder used in this fashion is commercially available and in general, will work with tape cassettes which will record for a number of hours. Also, conventionally the video recorder has means for noting the time and date and the length of the recorded message.

Typically, the customer's comments can be heard by removing the tape cassette from recorder 23 and playing it back or, as in the case with conventional video recorders, it may have its own playback circuit. Additionally, the playback circuit may be operated remotely.

I claim:

1. A system for a patron to vocally comment upon the goods and/or services provided by an establishment, said system comprising:

a stand located in an establishment for use by a patron of the establishment, said stand being at least partially enclosed by a sound barrier for reducing the chance that the patron's conversation will be overheard;

message repeater means having a pre-recorded introduction and voice message instructions for a patron using said stand;

message recording means for recording a voice message transmitted thereto;

telephone assembly means for use by a patron, said telephone assembly means mounted on said stand and including a telephone handset and a hook switch cradle for holding the handset, said handset including a transmitter for transmitting a voice message and a receiver for receiving a voice message; and electrical circuit means for energizing said message repeater means and said telephone handset receiver when said telephone handset is lifted off said hook switch cradle for sending the pre-recorded message from said message repeater means to said telephone handset receiver and a hand-operable momentary switch on said handset for energizing said message recording means and said telephone handset transmitter while said handset is off said hook switch cradle for transmitting a voice message from the patron to said recording means and for recording the patron's message.

* * * * *